235-379 SR
9/15/87 . OR 4,694,147

United States Patent [19]

Amemiya et al.

[11] Patent Number: 4,694,147

[45] Date of Patent: Sep. 15, 1987

[54] SLIP RECEPTION TERMINAL SYSTEM

[75] Inventors: Tsuguo Amemiya, Yokohama; Yutaka Magata, Tokyo; Satoshi Fujimatsu; Masahiro Morita, both of Owariasahi, all of Japan

[73] Assignee: Hitachi, Ltd., Tokyo, Japan

[21] Appl. No.: 826,676

[22] Filed: Feb. 6, 1986

[30] Foreign Application Priority Data

Mar. 20, 1985 [JP] Japan ................................ 60-57024

[51] Int. Cl.[4] ............................................ G06K 5/00
[52] U.S. Cl. .................................... 235/379; 235/380
[58] Field of Search ............................... 235/379, 380

[56] References Cited

U.S. PATENT DOCUMENTS 4,317,957 3/1982 Sendrow ........................ 235/379 X

*Primary Examiner*—Harold I. Pitts
*Attorney, Agent, or Firm*—Antonelli, Terry & Wands

[57] ABSTRACT

A slip reception terminal system. A slave unit reads an image written on a slip by a customer and recognizing a predetermined item of the slip and a master unit for receiving image data and recognized data sent from the slave unit, displaying the sequentially and transmitting a predetermined part of the data to a host system after the teller has verified and corrected the displayed data.

1 Claim, 3 Drawing Figures

SLIP RECEPTION TERMINAL SYSTEM

BACKGROUND OF THE INVENTION

This invention relates to a slip reception terminal system and, particularly, to a slip reception terminal system which simplifies the operation to such an extent that the teller is not required to make entry for each slip issued by a customer, but the teller merely makes confirmation and correction when needed.

At the counter of a bank, slips are processed on both of the lobby side and the teller's side. After a customer on the lobby side has issued a slip, a teller receiving the slip keys-in the written items on it on the counter terminal unit installed on the teller's side to complete the slip transaction process. In this case, for slips having an increased number of items or items which need complex key-in operations, the slip entry time increases on the teller's side, which will affect the time length needed for each transaction.

In order to simplify the transaction jobs at the counter of banks, particularly to save the manpower on the teller's side, there have been proposed transaction systems (e.g., refer to Japanese Patent Publication No. 59-41223). The above patented system is designed such that the teller checks the writing on a slip made by a customer by the provision of a monitor display unit installed on the teller's side and the teller merely presses the confirmation key to complete the slip entry operation. This system, however, requires of the teller to have a man-to-man action with the customer during the transaction, and therefore does not reduce the teller's operating time or manpower as expected.

In the state of banking business where there is an increasing damand for a highly automated banking online system introduced as a means of manpower saving, it is the most crucial factor for the slip handling counter job to reduce the time of slip entry operation by the teller. A method conceivable to meet the purpose is the direct slip entry by the customer. However, there are still problems in the operationability of the terminal unit and the use of seal.

SUMMARY OF THE INVENTION

The present invention contemplates to overcome the foregoing prior art deficiencies, and its prime object is to provide a slip reception terminal system which eliminates the need for the slip entry operation on the teller's side, but merely needs confirmation and correction, thereby reducing significantly the manpower of the teller's job.

In order to achieve the above object, the inventive slip reception terminal system characteristically includes a slave unit installed on the customer's side for reading the writing image on a slip written by a customer and recognizing certain items of the slip, and a master unit installed on the teller's side for receiving the image data and recognized data produced by the slave unit, displaying the data sequentially following the stacking or buffering process, and transmiting specified part of the data to the host system after the teller has confirmed and corrected the displayed data.

DESCRIPTION OF THE PREFERRED EMBODIMENT

Figure 1:
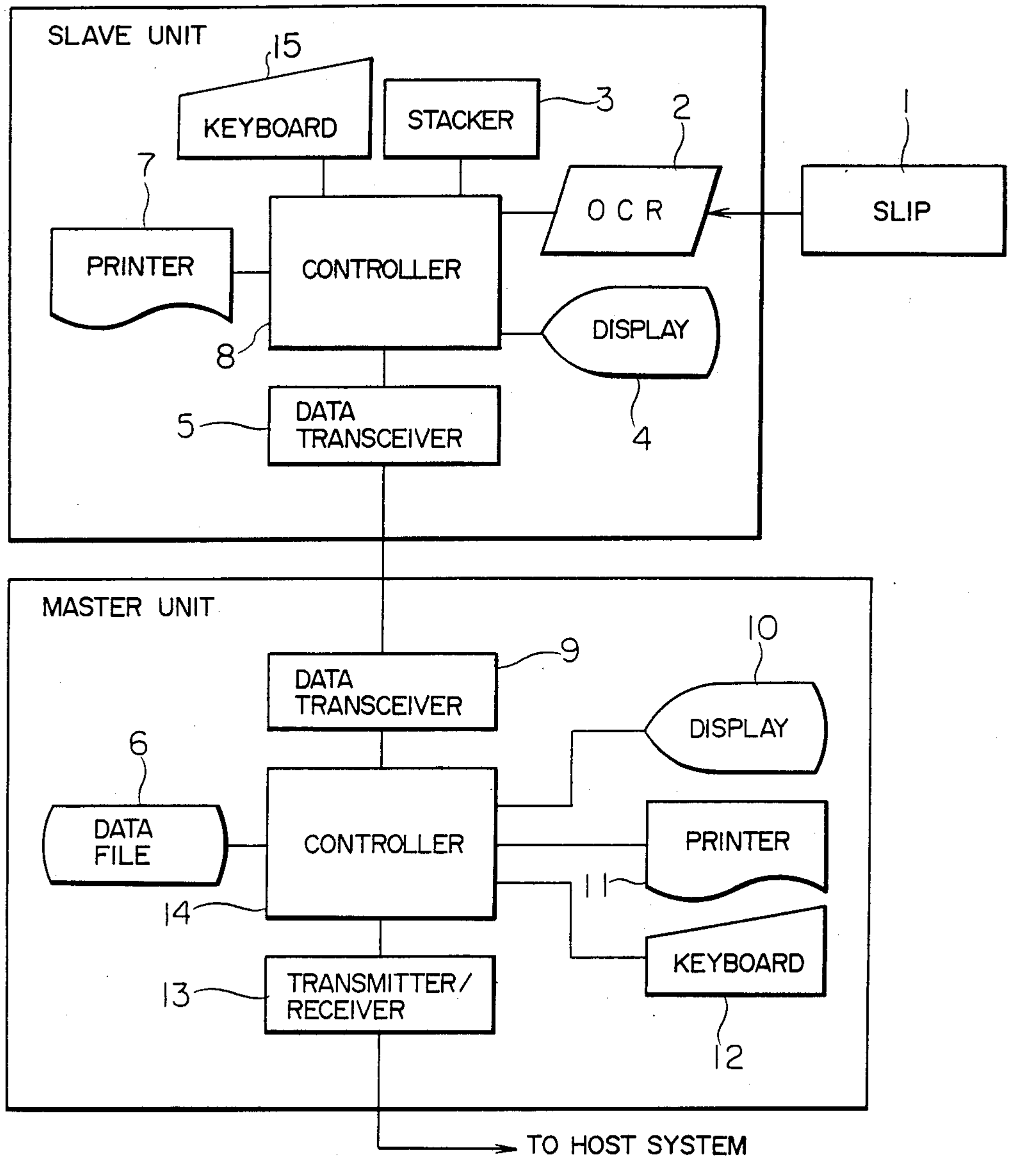
FIG. 1 is a block diagram showing the overall slip reception terminal system embodying the present invention.

FIG. 1 is a block diagram showing the overall slip reception terminal system embodying the present invention. The inventive slip reception terminal system, when applied to a banking online system for example, consists separately of a slave unit installed on the lobby side for recognizing and coding the input items and a master unit installed on the teller's side for verifying and correcting the input data. In operation, slip items which have been written by the customer and then keyed-in by the teller in the conventional system are read and coded by the optical character recognizing ability of the slave unit on the lobby side, and the preprocessed input data is transferred to the master unit on the teller's side. The teller checks the input data on the master unit and makes an additional entry only when correction is needed, whereby the manpower for transaction reception can be saved.

The slave unit incorporates a character image reader (e.g., OCR) 2, a stacker (e.g., slip stacker) 3, a display screen (e.g., CRT) 4, a data transceiver for communication with the master unit (e.g., communications controller) 5, a printer (e.g., number printer) 7, and a controller for controlling the input/output operations of these devices and recognizing input character image (e.g., controller) 8. The master unit incorporates a data file for storing input data (e.g., magnetic disk unit) 6, a data transceiver for receiving data from the slave unit (e.g., communications controller) 9, a display screen for displaying received data (e.g., fine CRT) 10, a hard copy unit (e.g., laser beam printer) 11, a keyboard for data entry by the teller (e.g., keyboard) 12, a data transmitter/receiver for communication with the host system (e.g., communications controller) 13, and a controller for controlling the input/output operations of these devices (e.g., controller) 14.

The terminal system described above has the following six functions, among which functions 1 and 2 are implemented by the slave unit, while functions 3, 4, 5 and 6 are implemented by the master unit.

These are function 1: Reading of the writing image on the slip; Function 2: Recognition of specified items on the slip; Function 3: Stacking process for recognized data; Function 4: Retrieval of stacked data; Function 5: Display of image data and OCR recognition code; Function 6: Data transmission to the host system.

The slave unit reads the writing image on the slip made by the customer and, after the recognition process for specified items of the slip, transfers the recognized data through the data transceiver 5 to the master unit. The master unit makes a queue of recognized data temporarily reads out the recognized data sequentially on the display screen 10 together with the writing image so that the customer's input is checked and corrected by the teller, and then transmits specified items to the host system. In this case, the slave and master units can execute their processes asynchronously, i.e., without the need of one-to-one correspondence between the jobs of the customer and teller, whereby the process on the teller's side can fast be executed.

Figure 2:
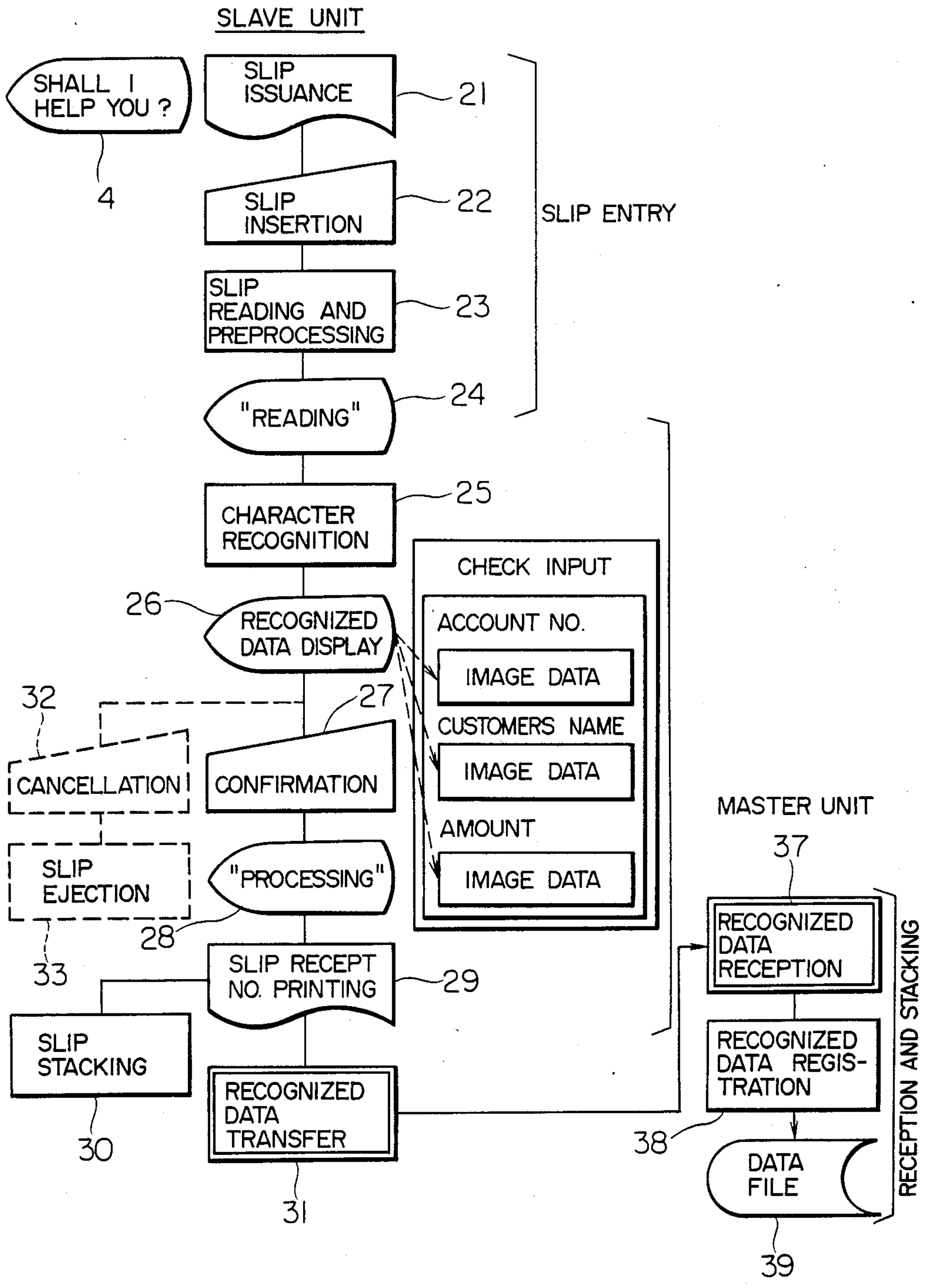
FIG. 2 is a flowchart showing the slip processing by the slave unit shown in FIG. 1.

FIG. 2 is a flowchart of the slip processing implemented by the slave unit. In response to the guidance displayed on the display screen 4, a customer at the counter of the bank issues a slip (step 21) and inserts the slip in the OCR 2 (step 22). The OCR 2 reads the slip and transfers the input data to the controller 8. The controller 8 defines the range of items to be recognized as characters for the input data such as an account number or an amount (step 23). During the above operation, a message "READING" appears on the display screen 4 (step 24). The controller 8 implements character recognition for the input data in the defined range and translates the image into codes (step 25). The display screen 4 displays the result of character recognition so that the customer checks the entry of the account number, customer's name and amount (step 26). If the customer presses the cancellation key of the keyboard 15 due to an error in the displayed data or the like (step 32), the slip is ejected and the customer is prompted to reissue a slip or suspend the issuance of the slip. If the customer has pressed the entry key of the keyboard 15 upon confirmation of the displayed data (step 27), the display screen 4 displays a message "PROCESSING" (step 28), and the printer 7 is activated to print the reception number on the slip (step 29). The printed slip is taken into the slip stacker 3 (step 30), and the image data and the codes as the result of character recognition are transferred to the master unit (step 31).

The character recognition result sent from the slave unit through the transmission path is received by the data transceiver 9 of the master unit and delivered to the controller 14 (step 37). The controller 14 registers the input recognition data sequentially in the data file 6 (step 38). The registered data is placed in the wait state for the process by the teller (step 39).

Figure 3:
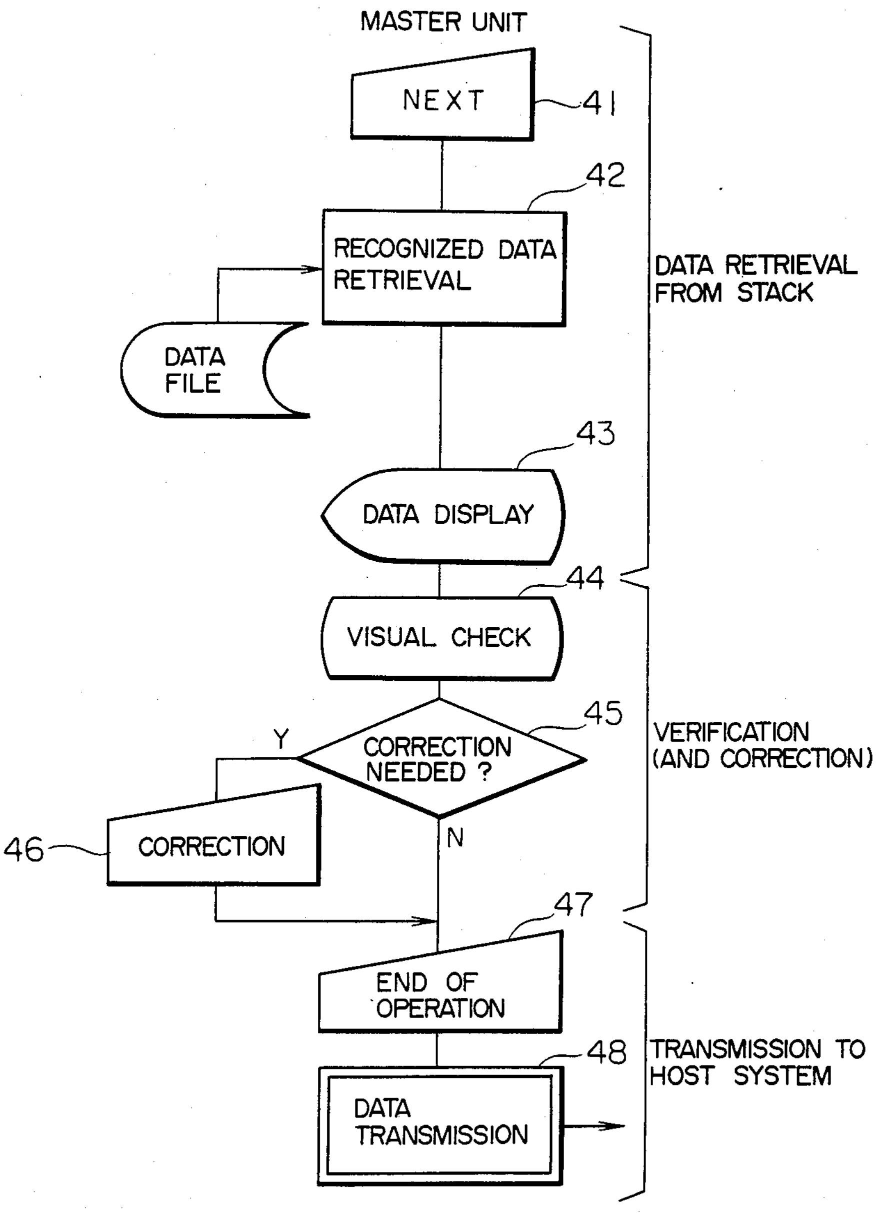
FIG. 3 is a flowchart showing the slip processing by the master unit shown in FIG. 1.

FIG. 3 is the flowchart of the slip processing by the master unit shown in FIG. 1. The following describes the operation of the master unit for data fetching, checking, correction and transmission to the host system. Each time the slip processing has completed, the teller makes a request through the keyboard 12 of the master unit for the next data (step 41), and the controller 14 takes out recognized data at the next position of the queue in the data file 6 (step 42) and displays it on the display screen 10 (step 43). The controller 14 displays the image data read by the slave unit and the character recognized data on the display screen 10 so that the teller compares both data for verification and correction. The teller checks the displayed data and makes a corrective entry through the keyboard 12 only when correction is needed (steps 44, 45 and 46). When the displayed data is correct, or after the corrective entry has been completed, the teller operates the keyboard 12 to instruct data transmission to the host system (steps 47 and 48). In response to the instruction, the controller 14 in the master unit operates on the transmitter/receiver 13 to transmit the processed data to the host system.

According to this invention, as described above, the recent advanced image input technique is utilized to enter a slip written by a customer through the OCR at the reception of transaction, and after the writing image on the slip has been recognized the teller merely checks and corrects the slip to complete the transaction.

Although in the above imbodiment a single slave unit is provided for the master unit, it is of course possible to configure a terminal system including a plurality of slave units for one master unit. Although in FIG. 1 the slave unit is designed to receive a slip from the customer, an alternative method is that the slip is returned to the customer after being processed by the slave unit so that the customer is prompted to bring the slip to the teller.

Although a banking online system has been described in the above embodiment, the present invention is not limited to the use in specific business such as banking, but can be applied to the field of general financial businesses handling slips.

According to this invention, as described above, the slip reception and recognition are made possible on the customer's side through the provision of a slave unit installed on the customer's side (lobby side) for implementing slip input and recognition, which allows the teller merely to check and correct the input data, i.e., freed from the slip entry operation, whereby the manpower of the teller's job can significantly be reduced.

What is claimed is:

1. A slip reception terminal system comprising:

a slave unit installed on the customer's side for reading an image written on a slip by a customer and recognizing a predetermined item of said slip; and a master unit installed on the teller's side for receiving image data and recognized data sent from said slave unit, stacking said data temporarily, displaying said data sequentially, and transmitting a predetermined part of said data to a host system after the teller has verified and corrected the displayed data.

* * * * *